(12) United States Patent
Qin et al.

(10) Patent No.: US 11,733,179 B2
(45) Date of Patent: Aug. 22, 2023

(54) BINOCULAR AUTOMATIC GEAR PITTING DETECTION DEVICE BASED ON DEEP LEARNING

(71) Applicant: ChongQing University, Chongqing (CN)

(72) Inventors: Yi Qin, Chongqing (CN); Dejun Xi, Chongqing (CN); Caichao Zhu, Chongqing (CN); Sheng Xiang, Chongqing (CN)

(73) Assignee: Chongqing University, Chongqing (CN)

( * ) Notice: Subject to any disclaimer, the term of this patent is extended or adjusted under 35 U.S.C. 154(b) by 228 days.

(21) Appl. No.: 17/085,723

(22) Filed: Oct. 30, 2020

(65) Prior Publication Data

US 2021/0133949 A1    May 6, 2021

(30) Foreign Application Priority Data

Nov. 1, 2019   (CN) ........................... 20191106137.6

(51) Int. Cl.
*G01N 21/952* (2006.01)
*G06T 7/00* (2017.01)
(Continued)

(52) U.S. Cl.
CPC ......... *G01N 21/952* (2013.01); *G06T 7/0004* (2013.01); *G06V 10/143* (2022.01);
(Continued)

(58) Field of Classification Search
CPC .... G06T 7/0004; G06V 10/143; G06V 20/10; G06V 10/22
See application file for complete search history.

(56) References Cited

U.S. PATENT DOCUMENTS

2021/0073962 A1\* 3/2021 Wolf ..................... G06T 7/001
2021/0383160 A1\* 12/2021 Vander Neut .......... G06K 9/627

OTHER PUBLICATIONS

An Evaluation of Gearbox Condition Monitoring Using Infrared Thermal Images Applied with Convolutional Neural Networks (Year: 2019).\*

\* cited by examiner

*Primary Examiner* — David Perlman
(74) *Attorney, Agent, or Firm* — Michael D. Eisenberg (57) ABSTRACT

The present invention belongs to the field of computer visual detection, and relates to a binocular automatic gear pitting detection device based on deep learning, comprising a gearbox system, a data acquisition system, an image processing system, a tooth surface positioning system, a control system and a motor, wherein the gearbox is used for installing paired meshing gears; the data acquisition system is arranged on the side wall of the gearbox, and a CCD industrial camera is arranged on the data acquisition system; the image processing system completes quantitative evaluation of gear pitting and target detection based on a deep learning technology; both ends of the tooth surface positioning system are respectively connected with the motor and the gearbox, and the torque of the motor is transmitted to an input shaft of the gearbox. The device can determine the optimal installation base points of the data acquisition system according to the characteristics of the meshing gears, and find effective detection areas in combination with the light source and camera arrangement solutions, thereby effectively saving the installation space of the detection device and adapting to the operating characteristics of the meshing gears.

4 Claims, 6 Drawing Sheets

(51) Int. Cl.
*G06V 10/22* (2022.01)
*G06V 10/143* (2022.01)
*G06V 20/10* (2022.01)
*G06V 10/70* (2022.01)
*G06V 10/82* (2022.01)
*H04N 5/33* (2023.01)

(52) U.S. Cl.
CPC .............. *G06V 10/22* (2022.01); *G06V 10/70* (2022.01); *G06V 10/82* (2022.01); *G06V 20/10* (2022.01); *G06T 2207/10012* (2013.01); *G06T 2207/20081* (2013.01); *G06T 2207/30164* (2013.01); *G06V 2201/07* (2022.01); *H04N 5/33* (2013.01)

BINOCULAR AUTOMATIC GEAR PITTING DETECTION DEVICE BASED ON DEEP LEARNING

TECHNICAL FIELD

The present invention belongs to the field of computer visual detection, and relates to a binocular automatic gear pitting detection device based on deep learning.

BACKGROUND

Gear transmission is widely used in the field of mechanical transmission, and has the advantages of efficient transmission, accuracy and reliable operation. Gear failure is a key factor that destroys the gear transmission. In-depth exploration of gear failure forms can ensure the reliability and service life of gear transmission. Gear pitting is one of the main gear failure forms. During the gear meshing operation, due to the effect of load stress, the temperature of the gear meshing surface is too high at the moment of meshing, and gluing occurs on the tooth surface. When the meshing gears are separated, material falls off the tooth surface under the action of gluing, and dotted pits are formed, which is pitting. If the pits are not detected and prevented, pitting will continue to expand under repeated loading, which will cause the breakage of gear teeth, causing irreparable losses. Therefore, in order to quantitatively control the law of pitting expansion and to effectively prevent the breakage of the teeth, accurate detection and prevention of gear pitting is imperative.

At present, gear pitting detection methods only rely on human eyes for observation and determination. This method not only has complicated steps, low efficiency, low accuracy and waste of a lot of human resources. More importantly, this method lacks scientific, intelligent, qualitative and quantitative detection means. No report is made on related research of gear pitting detection based on deep learning. No shaped product with reliable quantitative evaluation and detection of gear pitting is presented on the market.

SUMMARY

In view of this, the purpose of the present invention is to provide a binocular automatic gear pitting detection device based on deep learning, which completes the quantitative evaluation of gears through the processing of an image processing system and grades the gear pitting of different forms to effectively prevent the occurrence of breakage of gear teeth.

To achieve the above purpose, the present invention provides the following technical solution:

A binocular automatic gear pitting detection device based on deep learning comprises a gearbox, a data acquisition system, an image processing system, a tooth surface positioning system and a motor, wherein the gearbox is used for installing paired meshing gears; the data acquisition system is arranged on the side wall of the gearbox, and a CCD industrial camera is arranged on the data acquisition system; by adjusting the shooting position and the shooting angle of the CCD industrial camera, the image data in a gear pitting process is acquired and transmitted to the image processing system; the image processing system completes quantitative evaluation of gear pitting and target detection based on a deep learning technology; both ends of the tooth surface positioning system are respectively connected with the motor and the gearbox, and the torque of the motor is transmitted to an input shaft of the gearbox.

Optionally, the tooth surface positioning system belongs to a coupling having specific functions, and comprises a motor-side coupling and a gearbox-side coupling; the motor-side coupling is connected with a motor output shaft; the gearbox-side coupling is connected with a gearbox input shaft; double-row cylindrical roller bearings are installed outside the motor-side coupling; the bearing outer rings are provided with infrared device positioning sleeves; both sides of the bearings are provided with a static end cover and a moving end cover to form a bearing chamber; the static end covers, the bearing outer rings and the infrared device positioning sleeves are positioned by a sleeve limiting plate fixed on the gearbox; the moving end covers and the bearing inner rings rotate synchronously with the internal coupling; the surface of moving end cover is provided with a reflector limiting loop; and according to the position information of gear teeth, reflectors matched with the number of the gear teeth are attached to the reflector limiting loops on the surfaces of the moving end covers.

Optionally, the binocular automatic gear pitting detection device based on deep learning also comprises an infrared detection device for acquiring reflector information; the bearing inner rings, the moving end covers and the gears rotate synchronously; the number and positions of the reflectors on the reflector limiting loops of the moving end covers reflect the number and position information of the gear teeth; the infrared device positioning sleeves are fixed to provide support for the infrared detection device; the infrared detection system obtains the moving position information of the gear teeth through symmetrically placed infrared transmitter, infrared receiver and the reflectors; and a signal that the gear tooth surfaces just pass and an image at this time needs to be taken is provided for the data acquisition system through a relay.

Optionally, the binocular automatic gear pitting detection device based on deep learning also comprises a rack used for supporting the motor and the gearbox.

Optionally, the data acquisition system is fixed on the side wall of the gearbox by a magnetic base; the horizontal position of the CCD industrial camera is adjusted by a moving bracket and a slide rail assembly; the shooting angle of the CCD industrial camera is adjusted through an angle control bracket; the slide rail assembly determines the optimal installation base points $O_1$ and $O_2$ of the data acquisition system according to the characteristics of the meshing gears; a coordinate system is established with the center of the magnetic base as an origin; when the CCD industrial camera is perpendicular to an organic glass box cover, a circle Q is made with the longest distance from the center of the angle control bracket to the CCD industrial camera as a radius; when the circle Q is tangent to the gearbox cover, a horizontal straight line is made by an axis of the moving bracket; straight lines FG, HG, HI and FI that pass through the axes of two gear shafts and the apexes of the side walls of the gearboxes on both sides of the magnetic base are made; four straight lines respectively intersect with the above horizontal straight line at points $O_1$, $O_2$, J and K; $O_1$ and $O_2$ which make the structure of the detection device more compact are selected as the optimal installation base points; the horizontal displacements of the points $O_1$ and $O_2$ from the magnetic base are values $x_1$ and $x_2$; and the vertical displacement is value y.

Optionally, two gears are divided into left and right detection areas by a vertical straight line and a horizontal straight line which pass through the axes of the gears; gear meshing characteristics and light source arrangement conditions are used to determine: when a driving pinion rotates clockwise, effective detection areas are right areas of the vertical straight lines of the two gears, and when the driving pinion rotates anticlockwise, effective detection areas are left areas of the vertical straight lines of the two gears.

Optionally, a pair of CCD cameras are arranged to simultaneously detect the pitting of a pair of meshing gears.

Optionally, the infrared detection system is fixed on the infrared device positioning sleeve in the tooth surface positioning system through an infrared device bracket; the infrared device bracket is adjusted so that the infrared transmitter and the infrared receiver are symmetrically placed at a certain angle; and by adjusting the size of the infrared device bracket and the angle of the infrared device bracket, the intersection point of the light emitted by the infrared transmitter and the extension line of the axis of the infrared receiver intersects with the reflector limiting loop on the moving end cover.

The present invention has the following beneficial effects:

The present invention designs the binocular automatic gear pitting detection device based on deep learning. The device can determine the optimal installation base points of the data acquisition system according to the characteristics of the meshing gears, and find effective detection areas in combination with the light source and camera arrangement solutions, thereby effectively saving the installation space of the detection device and adapting to the operating characteristics of the meshing gears. For the technical problem of detecting the passing time and position of the gear teeth, the differential form of the tooth surface positioning system is used, that is, the moving end cover fixed to the bearing inner ring operates synchronously with the gears, and the infrared device sleeve fixed to the bearing outer ring is fixed, thereby effectively inhibiting the problem of unstable actual operation speed. The rapid response to identify whether a reflector passes through via the symmetrically placed infrared detection systems achieves the work requirements for obtaining a clear image of each tooth surface, and the system has simple structure, convenient installation, and easy application in engineering practice. The method of applying deep learning is proposed to segment and detect gear pitting images, which solves the problems of low accuracy, poor effect and excessive interference of human factors in the traditional pitting detection. The quantitative evaluation of gear pitting is completed through the processing of the image processing system. Different types of gear pitting are graded, which can accurately and effectively prevent the occurrence of breakage of the gear teeth and achieve the working requirements of precise and intelligent quantitative evaluation and detection of gear pitting.

Other advantages, objectives and features of the present invention will be illustrated to some extent in the subsequent description, and to a certain extent, will be apparent to those skilled in the art based on the following research, or can be instructed from the practice of the present invention. The objectives and other advantages of the present invention can be achieved and obtained by the following description.

DESCRIPTION OF DRAWINGS

In order to make the purposes, technical solutions and advantages of the present invention clearer, the present invention will be preferably described in detail below with reference to the accompanying drawings, wherein.

DETAILED DESCRIPTION

The embodiments of the present invention are described below through specific examples. Those skilled in the art can easily understand other advantages and effects of the present invention from the content disclosed in this description. The present invention can also be implemented or applied through other different specific embodiments. Various details in this description can also be subjected to various modifications or changes based on different viewpoints and applications without departing from the spirit of the present invention. It should be noted that the illustrations provided in the following embodiments merely illustrate the basic idea of the present invention in a schematic manner. In the case of no conflict, the following embodiments and features in the embodiments can be combined with each other.

The drawings are only used for exemplary illustration, are only schematic diagrams, not physical diagrams, and should not be construed as a limitation to the present invention. In order to better describe the embodiments of the present invention, some components of the drawings may be omitted, enlarged or reduced, and do not represent the size of an actual product. For those skilled in the art, it may be understood that certain known structures and their descriptions in the drawings may be omitted.

The same or similar reference numerals in the drawings of the embodiments of the present invention correspond to the same or similar components. In the illustration of the present invention, it should be understood that if the terms "up", "down", "left", "right", "front" and "rear" indicate the orientation or position relationships based on the orientation or position relationships shown in the drawings only for the convenience of describing the present invention and simplifying the illustration, instead of indicating or implying that the referred device or element must have a specific orientation, and constructed and operated in a specific orientation. Therefore, the terms for describing the position relationships in the drawings are only used for exemplary illustration, and should not be construed as a limitation to the present invention. For those ordinary skilled in the art, the specific meanings of the above terms can be understood according to specific situations.

Referring to FIG. 1 to FIG. 8, element numerals in the figures respectively represent: data acquisition system 1, rack 2, motor 3, infrared detection system 4, tooth surface positioning system 5, image processing system 6, gearbox 7, control system 8, meshing gear 9, magnetic base 11, slide rail assembly 12, moving bracket 13, track circle 14, light source 15, CCD industrial camera 16, angle control bracket 17, infrared transmitter 18, infrared receiver 19, infrared device bracket 23, motor output shaft 20, gearbox input shaft 21, sleeve limiting plate 22, reflector limiting loop 24, infrared device positioning sleeve 25, static end cover 26, bearing outer ring 27, moving end cover 28, bearing inner ring 29, motor-side coupling 30 and gearbox-side coupling 31.

Figure 1:
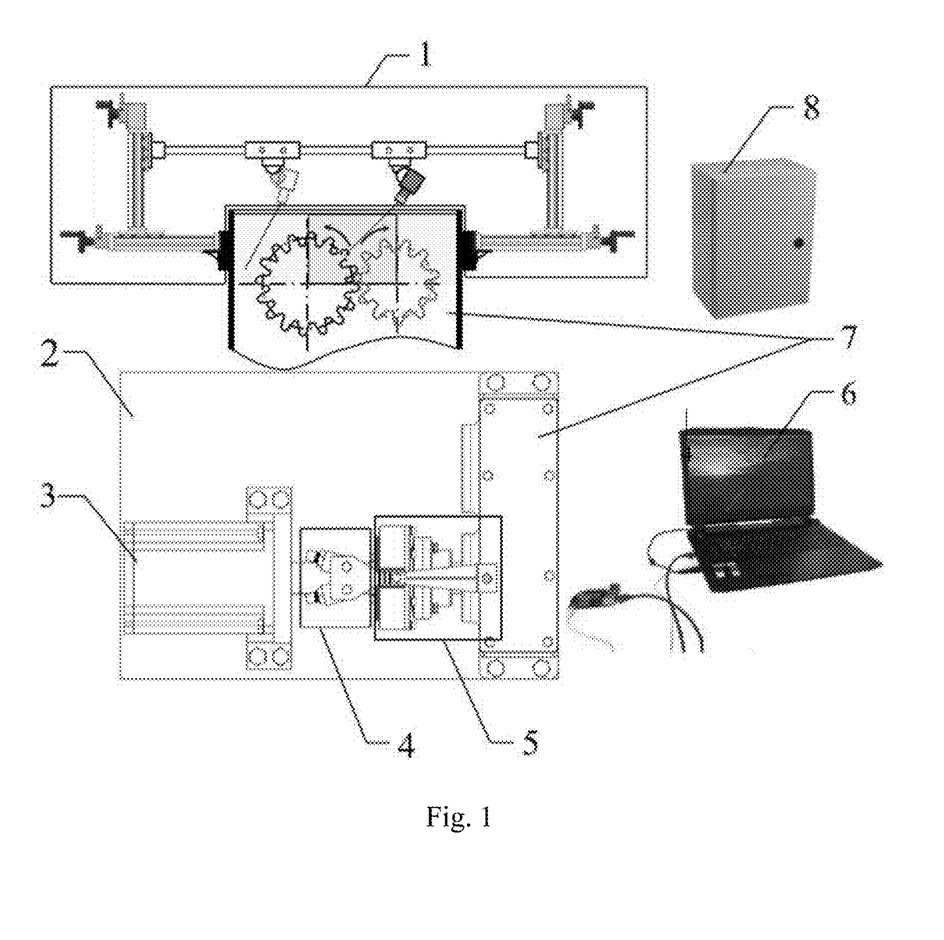
FIG. 1 is a structural schematic diagram of each system in the present invention.

A binocular automatic gear pitting detection device based on deep learning in the present invention comprises a gearbox 7, a data acquisition system 1, an image processing system 6, a tooth surface positioning system 5, an infrared detection system 4, a control system 8, a motor 3 and a rack 2, wherein a pair of meshing gears 9 exist in the gearbox 7, and a failure form of gear pitting occurs during operation. A gear pitting sample is provided for the pitting detection device. The data acquisition system 1 is fixed on the side wall of the gearbox 7 by a magnetic base 12; the horizontal position of the CCD industrial camera 16 is adjusted by a moving bracket 13 and a slide rail assembly 12; the shooting angle of the CCD industrial camera 16 is adjusted through an angle control bracket 17; and high-quality image data is acquired and quickly transmitted to the image processing system 6. The image processing system 6 completes quantitative evaluation of gear pitting and target detection by using a deep learning technology. One end of the tooth surface positioning system 5 is connected with a gearbox input shaft 21, and the other end is connected with a motor output shaft 20 to play a role of a coupling. A bearing inner ring 29, a moving end cover 28 and the gears rotate synchronously; the number and positions of reflectors on a reflector limiting loop 24 of the moving end cover 28 reflect the number and position information of the gear teeth; and the infrared device positioning sleeves 25 are fixed to provide support and positioning for the infrared detection device 4. An infrared transmitter 18 and an infrared receiver 19 are placed symmetrically. An infrared detection system 4 receives the light rays from the infrared transmitter 18 reflected by the reflectors through the infrared receiver 19, obtains the moving position information of the gears, and provides a signal that the gear tooth surfaces just pass and an image at this time needs to be taken for the data acquisition system 1 through a relay. The control system 8 is communicated with a computer through a serial port. The data acquisition system 1 is controlled to shoot key frame images according to the signals of the infrared detection system 4. The motor 3 provides power for the gearbox 7. The rack 2 provides stable limiting support for the motor 3 and the gearbox 7.

The tooth surface positioning system 5 belongs to a coupling having specific functions, and comprises a motor-side coupling 30 and a gearbox-side coupling 31; the motor-side coupling 30 is connected with an output shaft of the motor 3; and the gearbox-side coupling 31 is connected with an input shaft of the gearbox 7. Double-row cylindrical roller bearings are installed outside the motor-side coupling 30; bearing outer rings 27 are provided with infrared device positioning sleeves 25; both sides of the bearings are provided with a static end cover 26 and a moving end cover 28 to form a bearing chamber; the static end covers 26, the bearing outer rings 27 and the infrared device positioning sleeves 25 are positioned by a sleeve limiting plate 22 fixed on the gearbox 7; the moving end covers 28 and bearing inner rings 29 rotate synchronously with the internal coupling; the surface of moving end cover 28 is provided with a reflector limiting loop 24; and according to the position information of gear teeth, reflectors matched with the number of the gear teeth are attached to the reflector limiting loops 24 on the surfaces of the moving end covers 28. In the present embodiment, the moving bracket 13 is fixed by a series of slide rail assemblies 12. According to the characteristics of the meshing gears 9 and the arrangement solution of a light source 15, the position of each slide rail assembly 12 is adjusted to determine the optimal installation base points $O_1$ and $O_2$ of the data acquisition system 1; a coordinate system is established with the center of the magnetic base 11 as an origin; when the CCD industrial camera 16 is perpendicular to an organic glass box cover, a circle 14 is made with the longest distance from the center of the angle control bracket 17 to the CCD industrial camera 16 as a radius; when the circle 14 is tangent to the cover of the gearbox 7, a horizontal straight line is made by an axis of the moving bracket 13; straight lines FG, HG, HI and FI that pass through the axes of shafts of two meshing gears 9 and the apexes of the side walls of the gearboxes 7 on both sides of the magnetic base 11 are made; four straight lines respectively intersect with the above horizontal straight line at points $O_1$, $O_2$, J and K; $O_1$ and $O_2$ which make the structure of the detection device more compact are selected as the optimal installation base points; the horizontal displacements of the points $O_1$ and $O_2$ from the magnetic base 11 are values $x_1$ and $x_2$; and the vertical displacement is value y.

In the present embodiment, two CCD industrial cameras 16 are arranged above the gearbox 7. Circular light sources 15 are integrated outside lenses of the CCD industrial cameras 16. The two CCD industrial cameras 16 are fixed on the moving bracket 13 through the angle control bracket 17. The two CCD industrial cameras 16 are moved to non-interference positions through the corresponding moving bracket 13. The angle control bracket 17 is adjusted so that the fields of view of the cameras 16 are perpendicular to the tooth surfaces of the gears, thereby achieving the working requirement of simultaneously detecting the pitting of a pair of meshing gears 9.

Figure 3:
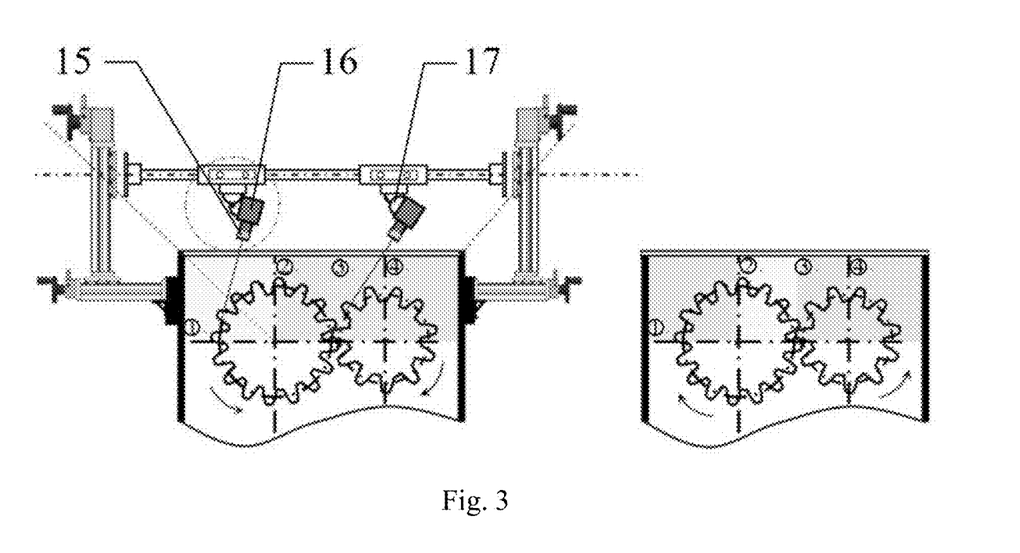
FIG. 3 is a schematic diagram of a detection area in the present invention.

In the present embodiment, two gears 9 are divided into left and right detection areas by a vertical straight line and a horizontal straight line which pass through the axes of the gears; the meshing characteristics of the gears 9 and the arrangement conditions of the light sources are used to determine: when a driving pinion 10 rotates clockwise, effective detection areas are right areas ① and ③ of the vertical straight lines of the two gears, and when the driving pinion 10 rotates anticlockwise, effective detection areas are left areas ② and ④ of the vertical straight lines of the two gears.

Figure 4:
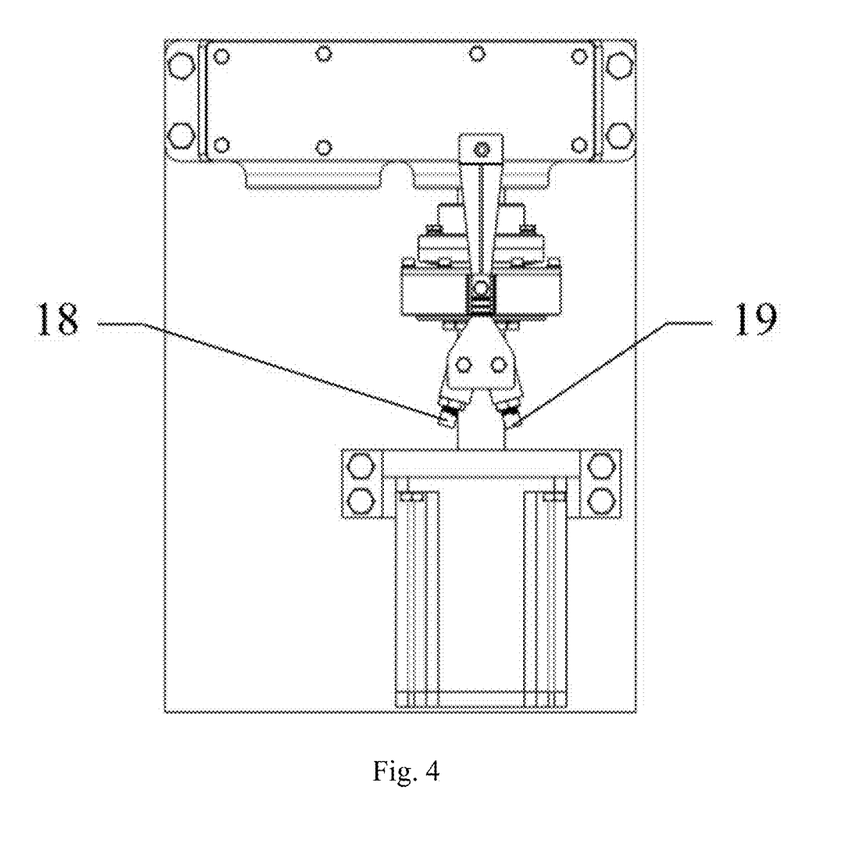
FIG. 4 is a top view of overall arrangement of a tooth surface positioning system and an infrared detection system in the present invention.
Figure 5:
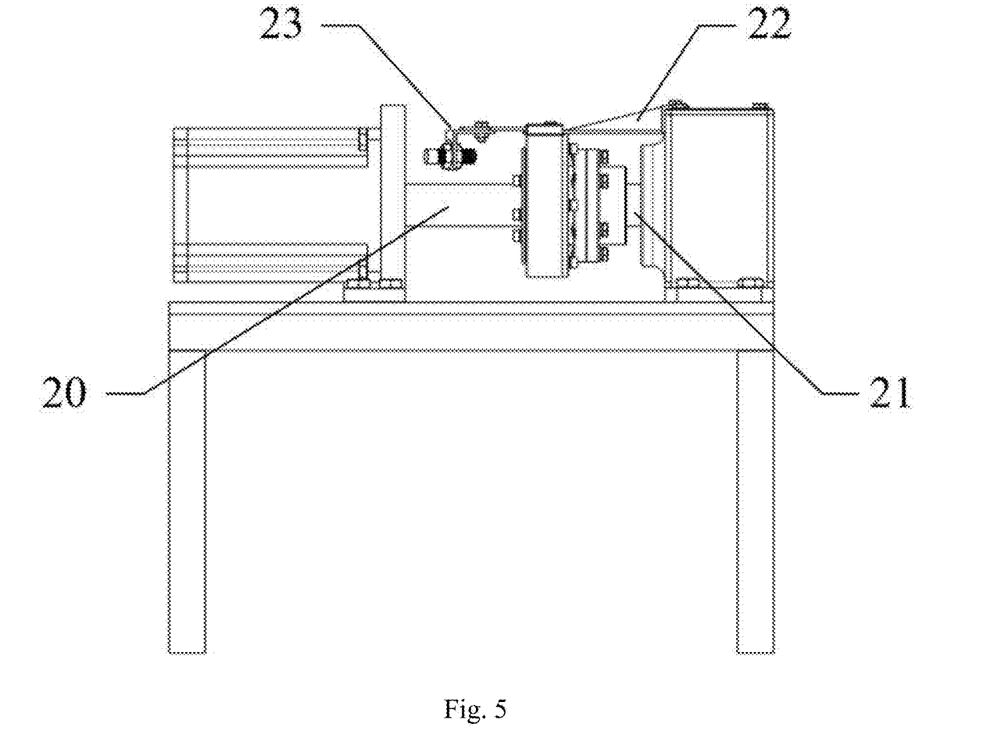
FIG. 5 is a left view of overall arrangement of a tooth surface positioning system and an infrared detection system in the present invention.
Figure 6:
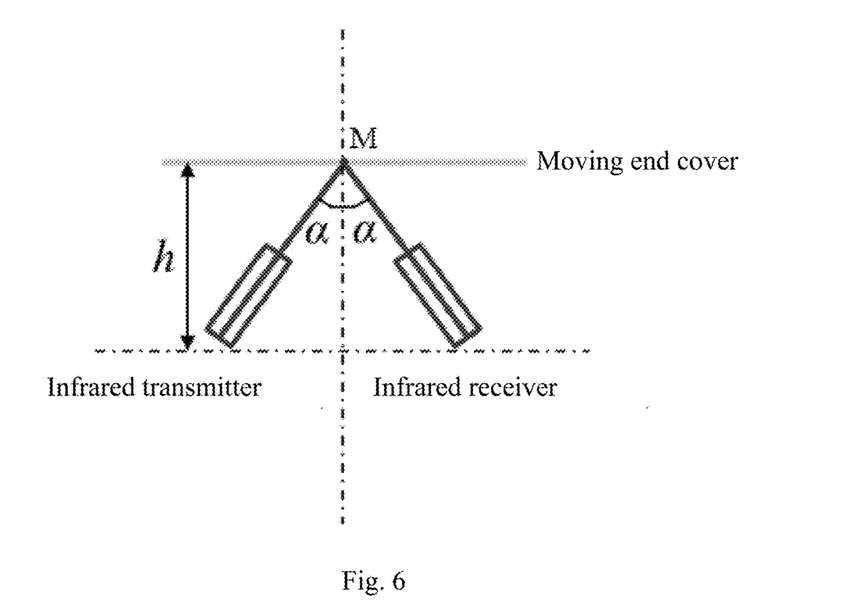
FIG. 6 is a schematic diagram of dimension relation of a tooth surface positioning system and an infrared detection system in the present invention.

In the present embodiment, the infrared detection system 4 is fixed on the infrared device positioning sleeve 25 in the tooth surface positioning system 5 through an infrared device bracket 23; the infrared device bracket 23 is adjusted so that the infrared transmitter 18 and the infrared receiver 19 are symmetrically placed; and by adjusting the size of the infrared device bracket 23 and the angle of the infrared device bracket 23, the intersection point of the light emitted by the infrared transmitter 18 and the extension line of the axis of the infrared receiver 19 intersects with the reflector limiting loop 24 on the moving end cover 28.

Figure 7:
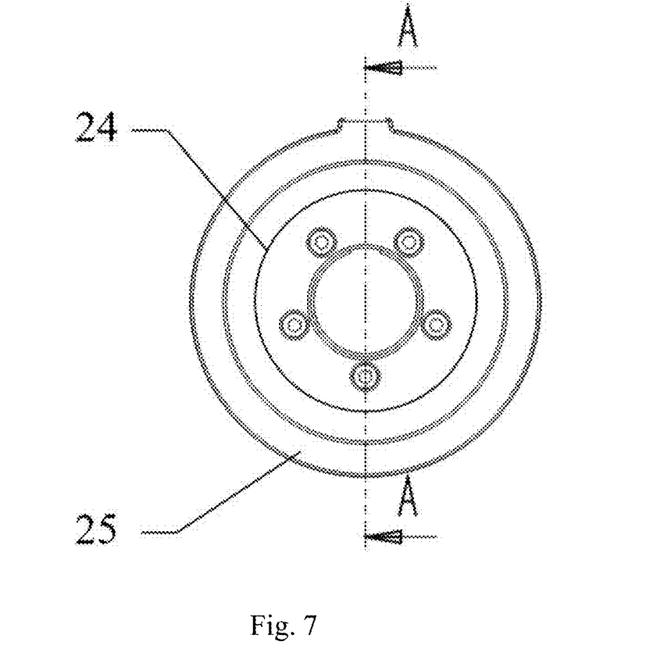
FIG. 7 is a front view of a tooth surface positioning system in the present invention.
Figure 8:
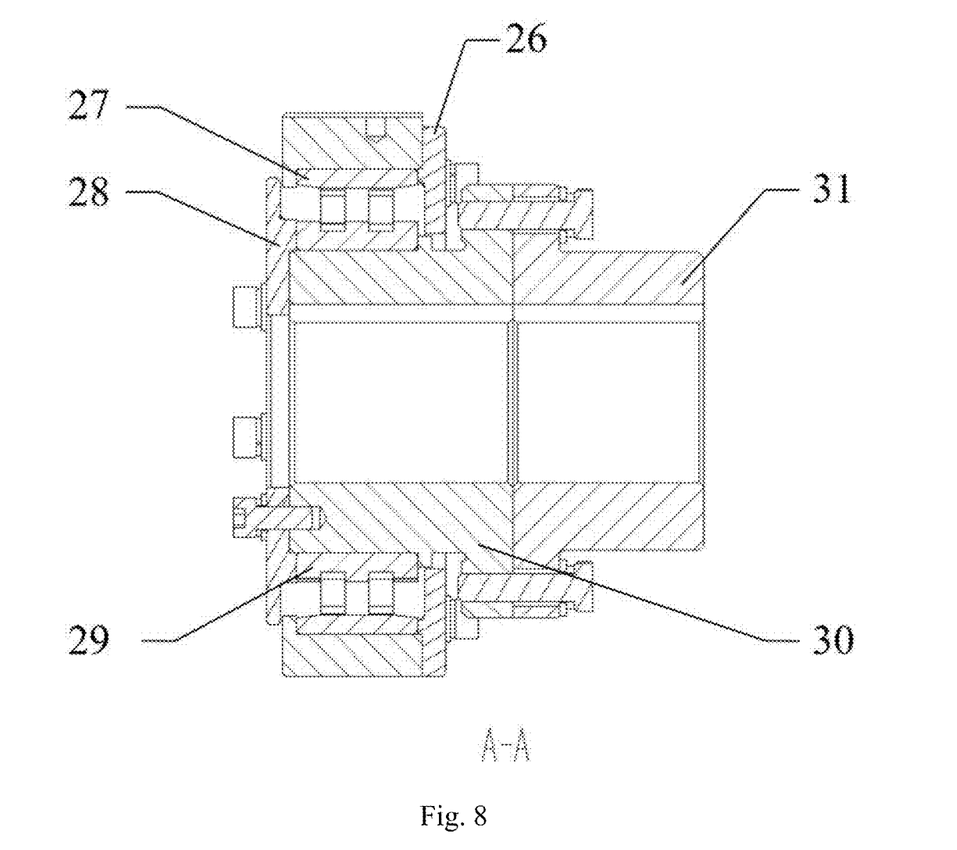
FIG. 8 is an A-A sectional view of FIG. 7.

In the present embodiment, the tooth surface positioning system 5 belongs to a coupling having specific functions. Double-row cylindrical roller bearings are fixedly installed outside the motor 3-side coupling 30; the outer sides of the bearing outer rings 27 are provided with infrared device positioning sleeves 25; both sides of the bearings are provided with a static end cover 26 and a moving end cover 28 to form a bearing chamber; the static end covers 26, the bearing outer rings 27 and the infrared device positioning sleeves 25 are fixedly installed and positioned by a sleeve limiting plate 22 fixed on the gearbox 7 without rotation; the moving end covers 28 and bearing inner rings 29 are fixedly installed and rotate synchronously with the internal coupling; the surface of moving end cover 28 is provided with a reflector limiting loop 24; and according to the position information of gear teeth, reflectors matched with the number of the gear teeth are attached to the reflector limiting loops 24 on the surfaces of the moving end covers 28.

In the present embodiment, the tooth surface positioning system 5 is connected with a gearbox input shaft 21 and a motor output shaft 20 through a motor 3-side coupling 30 and a gearbox 7-side coupling 31 to play a role of the coupling. Double-row cylindrical roller bearings are installed inside the tooth surface positioning system 5. A bearing inner ring 29 rotates synchronously with the gears 10. A bearing outer ring 27 is fixed to play the role of supporting and fixation for the infrared detection device 4 and effectively inhibit problems of difficulty in positioning gear teeth caused by unstable actual rotation speed. The infrared detection device 4 sends a gear tooth passing signal, and the data acquisition system 1 can obtain the tooth surface image of each gear tooth of the gears.

In the present embodiment, by adjusting the number and positions of the reflectors on the reflector limiting loop 24 on the surface of the moving end cover 28, the positioning requirements of the gear tooth surfaces of gears with different parameters are satisfied. The infrared detection system 4 sends the gear tooth passing signal to the control system 8 through a relay. The control system 8 controls the data acquisition system 1 to take an image of the tooth surface of the gear tooth passing by at this time.

In the present embodiment, the tooth surface positioning system 5 and the infrared detection system 4 can be applied to the positioning work of the gear teeth on any gear shaft. According to the content of the present invention, the tooth surface positioning system 5 and the infrared detection system 4 can be assembled on the gear shaft of a driven large gear 9 to complete the gear positioning work requirements of the driven large gear 9.

In the present embodiment, a gear pitting data set with different shapes is established, and a deep learning method is proposed for quantitative evaluation (instance segmentation) and target detection of gear pitting images.

Figure 2:
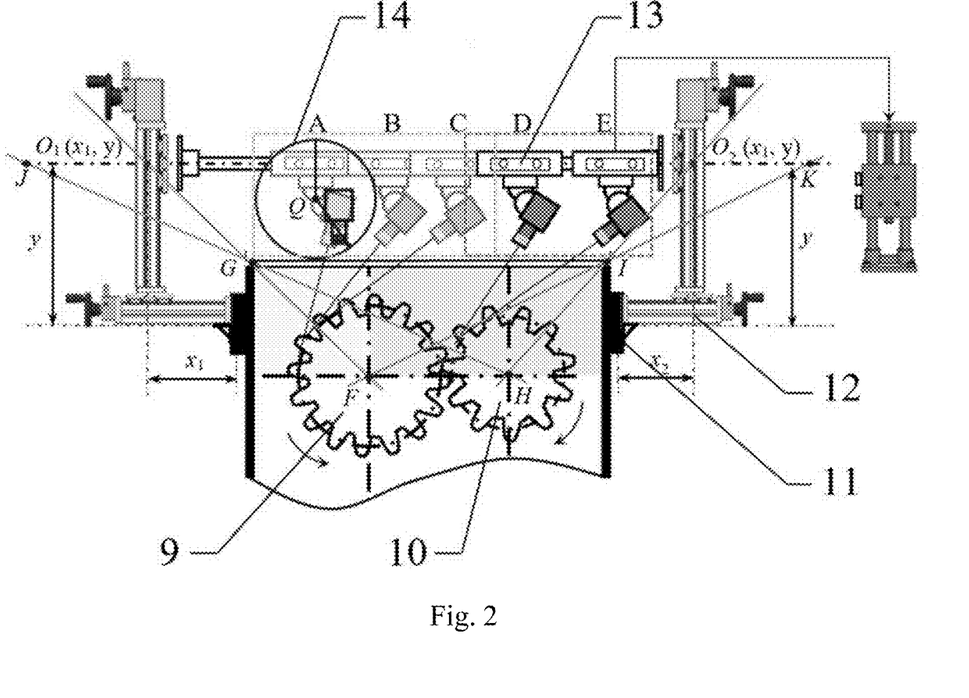
FIG. 2 is an analysis schematic diagram of installation sizes in the present invention.

To obtain a complete tooth surface image and save image processing work such as subsequent image shaping, the CCD industrial cameras 16 are placed perpendicular to the effective tooth surfaces of the meshing gears 9. When the CCD industrial cameras 16 adjust the angle through the angle control bracket 17 to satisfy the constraint condition, a trajectory circle 14 is formed with the angle control bracket 17 as the center and the maximum distance from the center of the angle control bracket 17 to the CCD industrial cameras 16 as a radius. When the trajectory circle 14 is tangent to the cover of the gearbox 7, then the center point of the angle control bracket 17 is a horizontal installation base point. The point can satisfy any angle rotation of the CCD industrial cameras 16, and also allows the data acquisition system 1 to be the smallest installation size, thereby saving the working space. Because the angle control bracket 17 is fixed on the slide rail assembly 12 through the moving bracket 13, then a horizontal straight line is made across the center of the moving bracket 13, which is a horizontal installation reference line of the data acquisition system 1. Considering the detection of the meshing characteristics of the meshing gears 9, four straight lines are made across the shaft centers F and H of two meshing gears 9 and the end points G and I of the cover of the gearbox 7, and intersect with the horizontal reference line at points J, $O_1$, $O_2$ and K. The four points satisfy the work requirements of detection of gear pitting. However, to make the structure of the device compact, $O_1$ and $O_2$ are selected as the optimal installation base points for the pitting detection device of the meshing gears 9.

Gear pitting generally occurs on the stressed tooth surfaces of a pair of meshing gears 9. When a driving pinion 10 rotates clockwise, with respect to the tooth surface direction in FIG. 2, the pitting appearance surface of the driving pinion 10 is a right tooth surface of each gear tooth; the pitting appearance surface of the driven large gear 10 is the right tooth surface of each gear; and two meshing gears 10 are divided into left and right detection areas by a vertical straight line and a horizontal straight line passing through the gear axis. When the right tooth surface of each gear tooth is detected, due to the constraint condition that the field of view of the cameras 16 shall be perpendicular to the tooth surface, the effective detection areas are the right areas ① and ③ of vertical straight lines of the two meshing gears 9; conversely, when the driving pinion 10 rotates anticlockwise, the effective detection areas are left areas ② and ④ of the vertical straight lines of the two meshing gears 9.

When the driving pinion 10 rotates clockwise, the CCD industrial cameras 16 detect the right tooth surface of each gear tooth in areas ① and ③; and the cameras are arranged according to the actual working conditions and the principle that two CCD industrial cameras 16 do not interfere with each other. For the driven large gear 9, the CCD industrial cameras 16 can be arranged at three points A, B, and C. For the driving pinion 10, the CCD industrial cameras 16 can be arranged at two points D and E, wherein points C and D interfere with each other to avoid C-D point arrangement solution. When the CCD industrial cameras 16 are installed at point E, the CCD industrial cameras may interfere with the side slide rail assembly 14. Therefore, point E is not considered for the installation points of the CCD industrial cameras 16. Through comprehensive analysis, the solutions of the installation points of the moving brackets 13 of the two CCD industrial cameras 16 are A-D and B-D.

The infrared transmitter 18 and the infrared receiver 19 are symmetrically placed at an angle α with respect to the axis of the output shaft 20 of the motor 3 shaft or the axis of the input shaft 21 of the gearbox. The light rays emitted by the infrared transmitter 18 intersect with the extension line of the infrared receiver 19 at point M. Point M is located on the reflector limiting loop 24 of the moving end cover 28. The reflectors are attached to the reflector limiting loop 24. The number and positions of the reflectors represent the number and positions of the gears. In this way, the light rays emitted by the infrared transmitter 18 are reflected on the infrared receiver 19 by the reflectors on the moving end cover 28, to complete the final work requirement that the infrared detection system 4 detects whether the gear teeth pass through. The infrared detection system 4 is simple in structure, small and convenient, rapid in response speed and high in detection accuracy.

In conclusion, in practical application, in the harsh environment of the gearbox 7 with lubricant fluid, the detection device can obtain high-quality data set images, obtain clear images of each tooth surface, and effectively inhibit the problem of unstable actual rotation speed. The present invention obtains the optimal installation base points and the effective detection areas of the data acquisition system 1 of the device through a series of theoretical analysis, and realizes accurate acquirement of data set images adapted to the meshing gears 9. The deep learning method is used to segment and detect gear pitting images, so as to solve the problems of low accuracy, poor effect and excessive interference of human factors in the traditional pitting detection method. The quantitative evaluation of gear pitting is completed through the processing of the image processing system 6. Different types of gear pitting are graded, which can accurately and effectively prevent the occurrence of breakage of the gear teeth and achieve the working requirements of precise and intelligent quantitative evaluation and detection of gear pitting.

Finally, it should be noted that the above embodiments are only used to illustrate the technical solution of the present invention, not to limit the technical solution. Although the present invention is described in detail by referring to the preferred embodiments, those ordinary skilled in the art shall understand that the technical solution of the present invention can be amended, or replaced equivalently. The amendment and equivalent replacement shall be covered within the scope of the claims of the present invention without departing from the spirit and the scope of the technical solution.

The invention claimed is:

1. A binocular automatic gear pitting detection device based on deep learning, characterized by comprising a gearbox, a data acquisition system, an image processing system, a tooth surface positioning system and a motor, wherein the gearbox is used for installing paired meshing gears;

the data acquisition system is arranged on the side wall of the gearbox, and a CCD industrial camera is arranged on the data acquisition system; by adjusting the shooting position and the shooting angle of the CCD industrial camera, the image data in a gear pitting process is acquired and transmitted to the image processing system;

the image processing system completes quantitative evaluation of gear pitting and target detection based on a deep learning technology;

both ends of the tooth surface positioning system are respectively connected with the motor and the gearbox, and the torque of the motor is transmitted to an input shaft of the gearbox;

the tooth surface positioning system belonging to a coupling having specific functions, and comprises a motor-side coupling and a gearbox-side coupling;

the motor-side coupling is connected with a motor output shaft;

the gearbox-side coupling connected with a gearbox input shaft;

double-row cylindrical roller bearings installed outside the motor-side coupling;

bearing outer rings provided with infrared device positioning sleeves;

both sides of the bearings provided with a static end cover and a moving end cover to form a bearing chamber;

the static end covers, the bearing outer rings and the infrared device positioning sleeve positioned by a sleeve limiting plate fixed on the gearbox;

the moving end covers and bearing inner rings rotating synchronously with the internal coupling;

the surface of moving end cover provided with a reflector limiting loop; and according to the position information of gear teeth, reflectors matched with the number of the gear teeth attached to the reflector limiting loops on the surfaces of the moving end covers;

the data acquisition system fixed on the side wall of the gearbox by a magnetic base;

the horizontal position of the CCD industrial camera adjusted by a moving bracket and a slide rail assembly;

the shooting angle of the CCD industrial camera adjusted through an angle control bracket the slide rail assembly determining the optimal installation base points $O_1$ and $O_2$ of the data acquisition system according to the characteristics of the meshing gears;

a coordinate system established with the center of the magnetic base as an origin;

when the CCD industrial camera is perpendicular to an organic glass box cover, a circle Q made with the longest distance from the center of the angle control bracket to the CCD industrial camera as a radius;

when the circle Q is tangent to the gearbox cover, a horizontal straight line made by an axis of the moving bracket;

straight lines FG, HG, HI and FI that pass through the axes of two gear shafts and the apexes of the side walls of the gearboxes on both sides of the magnetic base made;

four straight lines respectively intersecting with the above horizontal straight line at points $O_1$, $O_2$, J and K; $O_1$ and $O_2$ which make the structure of the detection device more compact selected as the optimal installation base points;

horizontal displacements of the points $O_1$ and $O_2$ from the magnetic base are values $x_1$ and $x_2$;

and the vertical displacement is value y.

2. The binocular automatic gear pitting detection device based on deep learning according to claim 1, characterized by also comprising an infrared detection device for acquiring reflector information; the bearing inner rings, the moving end covers and the gears rotate synchronously; the number and positions of the reflectors on the reflector limiting loops of the moving end covers reflect the number and position information of the gear teeth; the infrared device positioning sleeves are fixed to provide support for the infrared detection device; the infrared detection system obtains the moving position information of the gear teeth through symmetrically placed infrared transmitter, infrared receiver and the reflectors; and a signal that the gear tooth surfaces just pass and an image at this time needs to be taken is provided for the data acquisition system through a relay.

3. The binocular automatic gear pitting detection device based on deep learning according to claim 1, characterized in that two gears are divided into left and right detection areas by a vertical straight line and a horizontal straight line which pass through the axes of the gears; gear meshing characteristics and light source arrangement conditions are used to determine: when a driving pinion rotates clockwise, effective detection areas are right areas of the vertical straight lines of the two gears, and when the driving pinion rotates anticlockwise, effective detection areas are left areas of the vertical straight lines of the two gears.

4. The binocular automatic gear pitting detection device based on deep learning according to claim 2, characterized in that the infrared detection system is fixed on the infrared device positioning sleeve in the tooth surface positioning system through an infrared device bracket; the infrared device bracket is adjusted so that the infrared transmitter and the infrared receiver are symmetrically placed at a certain angle; and by adjusting the size of the infrared device bracket and the angle of the infrared device bracket, the intersection point of the light emitted by the infrared transmitter and the extension line of the axis of the infrared receiver intersects with the reflector limiting loop on the moving end cover.

* * * * *